Patented June 15, 1926.

1,588,607

UNITED STATES PATENT OFFICE.

RENÉ OPPENHEIM, OF LEVALLOIS-PERRET, FRANCE, ASSIGNOR TO SOCIETE ANONYME LE CARBONE, OF LEVALLOIS-PERRET, FRANCE.

PROCESS FOR RENDERING A POROUS POWDER IMPERMEABLE TO LIQUIDS.

No Drawing. Application filed April 10, 1924, Serial No. 705,684, and in France December 27, 1923.

The present invention has for its object a process for rendering impermeable the grains of a powder consisting of porous particles in order to render them impenetrable by liquids and to thus permit them to retain their properties of catalysis and the absorption of liquids during longer periods of use.

This process is particularly applicable to the impermeabilization of the grains of powder which consists of porous particles, such as powdered wood charcoal, utilized either in an agglomerated state, or in a pulverulent state, in electric batteries and accumulators for the purpose of absorbing the gases evolved by the reactions which take place and to permit the depolarization by the oxygen of the air. By the application of this process the grains comprising this powder cannot be penetrated by the liquid of the electrolyte, yet permit the gases evolved during the working of the battery to pass through them.

The present invention affords the advantage of ensuring to electric batteries which polarization is performed by the air and absorption of the gases evolved by the reaction which takes place, a satisfactory normal working for a longer period of time and to considerably reduce their internal resistance to the passage of the current.

The process according to this invention, consists in intimately mixing with the powder a colloidal suspension capable of pectization, in a quantity sufficient to coat each individual grain of the powder with a pectinized film, impenetrable by liquids but yet permeable by gases.

The powder with the impermeabilized porous grains thus obtained may afterwards be utilized either alone, or admixed with a depolarizer, such as manganese dioxide, for example. This powder will be enclosed in a porous receptacle of earthenware or fabric, or will be compressed into the form of briquettes.

By way of explanation I will proceed to describe a mode of application of the present process for the impermeabilization of a wood charcoal powder designed to be used in the manufacture of electric batteries in which depolarization is performed by the oxygen of the air.

Into a vessel containing about 30 kilogrammes of ordinary wood charcoal, in powder, to which powdered graphite may be added for the purpose of increasing its conductivity, there is poured a colloidal suspension prepared for example in the following manner:—

875 grammes of fecula are dissolved in one litre of cold water and this solution is afterwards mixed with about 9 litres of water heated to a temperature of about 85 degrees centigrade.

After it has cooled down this colloidal suspension is poured, as above stated, over the powdered wood charcoal, to which powdered graphite may or may not be added, and the whole mass is stirred so as to obtain as intimate a mixture as possible.

During this stirring, the colloidal suspension forms on the surface of each grain of the powdered wood charcoal a coagulum which dries until pectization takes place.

Each grain of the powder is therefore enveloped by this pectized coagulum, which constitutes a filmlike coating which protects it against any ulterior penetration by liquid.

It should be noted that owing to the rapidity with which the coagulum is formed and its immediate pectization, each porous grain is immediately isolated from the colloidal suspension, and the duration of the stirring of the powder with this latter has no influence on the thickness of the film formed on each grain. Only an extremely thin filmlike covering can therefore form without any penetration of the colloidal material into the mass of each of the porous grains, and consequently these latter always retain their properties of absorption and adsorption of the gases.

The product thus obtained, the grains of which are now impermeabilized, can be used either in dry batteries or those in which the liquid is immobilized, and even in accumulators. It is used, with or without the addition of manganese dioxide, either in the form of powder or in an agglomerated form according to the type of battery or accumulator in which it is to be employed. In the latter case, the powder is rammed around the positive electrode of the battery into a porous vessel of earthenware of the ordinary kind or into a receptacle of fabric, and in the second case the powder is compressed into the form of blocks or briquettes agglomerated on to the positive electrode of the battery or fixed thereto by any well known means.

For the constitution of the colloidal suspension utilized in the present process, I may employ, instead of the fecula specified above, any other suitable material, such for example as arrowroot, gelatinous silica, fish glue, or a mineral soap, say a metallic oleomargarate such as oleo-margarate of zinc, these colloidal suspensions being prepared, as is described in the prior United States patents filed 30 June 1922 Serial No. 571,926 and 19 October 1923 Serial No. 669,625.

When fecula is used I may add thereto a certain proportion of glycerine, for example 20 to 30 grammes per litre of suspension, for the purpose of retarding the pectization, and to avoid cracks in the pectized colloid, particularly in cases where the powder is to be agglomerated under severe compression.

The proportions of the elements employed in the process forming the subject matter of this invention may be modified according to the applications thereof.

Claims:

1. A process for rendering impermeable the grains of a powder composed of porous particles, consisting in intimately mixing with such powder a pectizable colloidal suspension, having the property of forming at the surface of each of the porous grains, under the effect of the absorbing properties of the latter, a pectized film impenetrable by liquids.

2. A process for rendering impermeable the porous grains of a powder adapted to be used as depolarizing material in electric batteries and accumulators, consisting in intimately mixing with such powder a pectizable colloidal suspension, having the property of forming at the surface of each of the porous grains, under the effect of the absorbing properties of the latter, a pectized film impenetrable by liquids.

3. A process consisting in intimately mixing with the porous grains of a powder adapted to be used as a depolarizing material in electric batteries and accumulators, a pectizable colloidal suspension having the property of forming at the surface of each of the porous grains, under the effect of the absorbing properties of the latter, a pectized film impenetrable by liquids, agglomerating the grains of such powder thus covered with a pectized film impenetrable by liquids so as to constitute a block, and fitting up in the usual way this block about the positive electrode.

4. A process for rendering impermeable the porous grains of a powder composed of charcoal and adapted to be used as a depolarizing material in electric batteries and accumulators, consisting in intimately mixing with this powdered charcoal, a pectizable colloidal suspension having the property of forming at the surface of each of the porous grains of said powdered charcoal, under the effect of the absorbing properties of these grains, a pectized film impenetrable by liquids.

5. A process for rendering impermeable the porous grains of a powder composed of charcoal to which is added graphite and adapted to be used as a depolarizing material in electric batteries and accumulators, consisting in intimately mixing with the pulverulent mixture a pectizable colloidal suspension having the property of forming at the surface of each of the porous grains of said powder, under the effect of the absorbing properties of these grains, a pectized film impenetrable by liquids.

6. A process of rendering impermeable the porous grains of powder composed of charcoal to which are added graphite and manganese dioxide and adapted to be used as a depolarizing material in electric batteries and accumulators, consisting in intimately mixing with the pulverulent mixture a pectizable colloidal suspension having the property of forming at the surface of each of the porous grains of said powder, under the effect of the absorbing properties of these grains, a pectized film impenetrable by liquids.

7. A process for rendering the grains of a powder, composed of porous particles, impermeable, consisting in intimately mixing with such powder a colloidal suspension constituted by a hot solution of fecula in water, in such a way that each of the grains of this powder is individually covered with a pectized film impenetrable by liquids.

8. A process for rendering the grains of a powder, composed of porous particles, impermeable, consisting in intimately mixing with such powder a colloidal suspension constituted by a hot solution of fecula in water with the addition of glycerine, in such a way that each of the grains of this powder is individually covered with a pectized film impenetrable by liquids.

The foregoing specification of my "process for rendering a porous material in the form of a powder impermeable to liquids" signed by me this 1st day of April 1924.

RENÉ OPPENHEIM.